3,355,257
Patented Nov. 28, 1967

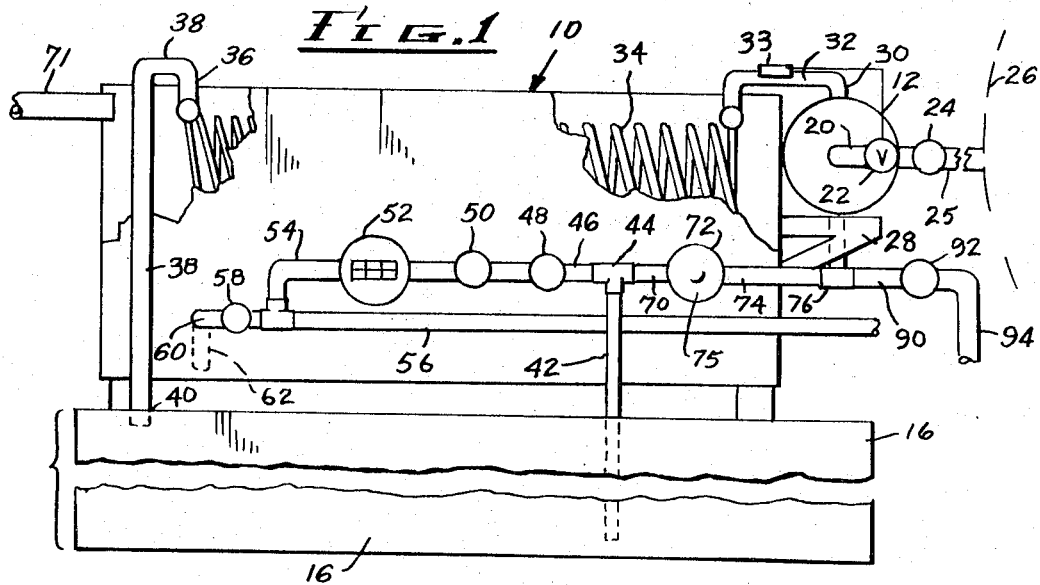
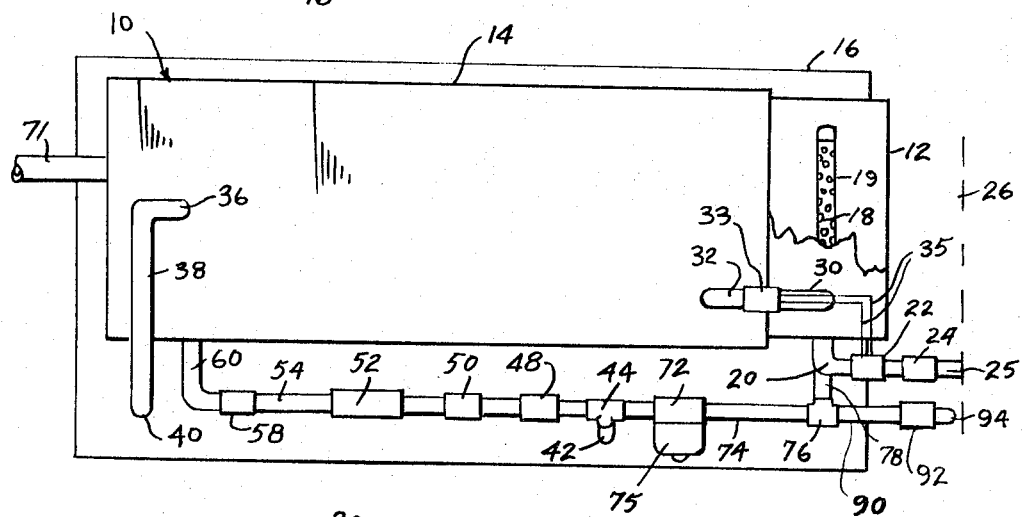
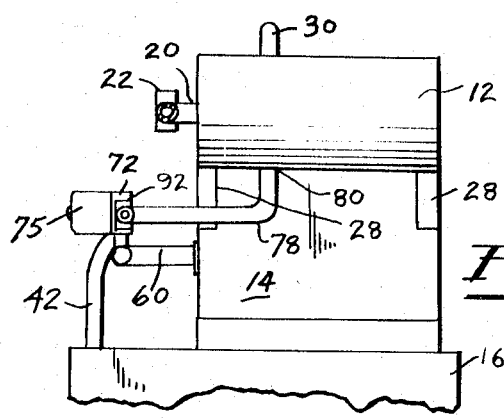
INVENTOR.
BY HAROLD W. SORENSEN
Moore, White & Burd ns">United States Patent Office

3,355,257
ANHYDROUS AMMONIA CONVERTER
Harold W. Sorensen, St. James, Minn. 49782
Filed Nov. 12, 1963, Ser. No. 322,649
5 Claims. (Cl. 23—285)

The present invention relates to fluid mixing and diluting equipment and more particularly to an improved apparatus and process for converting anhydrous ammonia to an aqueous solution of ammonium hydroxide.

Briefly stated, the present invention relates to an improved converter having a storage means, a mixing means and a means for transporting liquid to the mixing means. Preferably the liquid which is held in the storage means is circulated at least during a portion of the conversion process through the mixing means while adding further liquid to that which is already present. In a preferred embodiment of the invention, the mixing means is formed from a relatively small enclosure or tank and the rate at which anhydrous ammonia is fed to the mixing tank is controlled by the temperature of the aqueous ammonia flowing out of the mixing tank.

With the ever increasing use of aqueous solutions of ammonium hydroxide for fertilizing crops, it has become increasingly important to provide a fast and economical system for rapidly transporting anhydrous ammonia from a manufacturing site to the locality in which the ammonia is to be used and then converting it to ammonium hydroxide of the proper concentration. The process of loading and transporting the anhydrous ammonia in tank cars has been adequately solved. Many tons of anhydrous ammonia are transported in pressurized cars every year. On the other hand, no entirely satisfactory system has been generally available in the past for converting the anhydrous ammonia to aqueous ammonia at the location where it is to be used without the facilities of a relatively large scale chemical plant.

The devices which have been previously proposed for converting anhydrous ammonia to aqueous ammonia or ammonium hydroxide have been expensive to construct, time consuming and difficult to operate or otherwise partially ineffective in operation. One of the specific difficulties encountered in previous devices of the type described is the lack of a satisfactory means for eliminating the heat generated during the mixing operation.

A further shortcoming of some of the previous devices of the type described is that there was no simple but reliable means for obtaining a mixture of a desired concentration.

Another disadvantage of many of the previous devices of the type described is that no provision was made for reliably preventing unsafe operating temperatures during the conversion process. A still further difficulty of many of the prior devices of the type described derive from the fact that the presence of an operator was necessary during the entire conversion process.

In view of these and other shortcomings of the prior art, it is one object of the present invention to provide an improved apparatus and process for converting anhydrous ammonia to ammonium hydroxide.

A further object of the present invention is the provision of an improved relatively small and inexpensive apparatus of the type described in which the amount of heat generated during the conversion process can be adequately and reliably controlled.

A further object of the present invention is the provision of an improved apparatus of the type described including a reaction chamber and a temperature sensing means at the outlet of the reaction chamber for controlling the rate at which material is fed to the reaction chamber.

A further object of the present invention is the provision of an improved apparatus of the type described wherein the concentration of the reaction product resulting from the process can be accurately and reliably controlled.

A further object of the present invention is the provision of an improved apparatus and process for converting anhydrous ammonia to aqueous ammonia wherein the mixing process can be carried out with only relatively minor attention by an operator.

Other objects of the invention will become apparent as the description proceeds.

To the accomplishment of the forgoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a front elevational view of the apparatus according to the present invention partly broken away;

FIGURE 2 is a plan view of the apparatus according to the present invention partly broken away and;

FIGURE 3 is a right end elevational view of the apparatus of FIGURES 1 and 2.

Referring now to the drawings there is shown an ammonia converter 10 in accordance with the present invention. The converter 10 includes a mixing tank such as a cylindrical horizontally disposed reaction vessel 12, a heat exchange tank 14 and a storage tank 16.

Extending into the reaction vessel 12 is a distribution means such as a pipe 18 which is provided with a plurality of perforations 19 therein. The pipe 19 can, for example, comprise a 1½ inch diameter pipe bored with holes of about ¼ inch in diameter. The left end of pipe 18 as seen in FIGURE 3, passes through a wall of the vessel 12 and is connected to a line 20 which communicates with a metering means such as an electrically operated metering valve 22 of a suitable known construction which is coupled in series with a check valve 24. Valve 24 is connected to allow the flow of material therethrough in the direction of the vessel 12 but preventing flow in the reverse direction.

The check valve 24, in turn, communicates through a line 25 with a source of anhydrous ammonia under pressure such as a pressurized railroad tank car 26 (FIGURES 1 and 2). Thus, when the car 26 is unloaded the anhydrous ammonia stored within the tank car 26 will flow from the car due to its own vapor pressure through the line 25, through the check valve 24, through motor controlled metering valve 22 and through line 20 to the distribution means such as pipe 18.

As can be clearly seen in FIGURES 1 and 2, the reaction vessel 12 is mounted upon the end of the heat transfer tank 14 in any convenient manner as by a bracket 28. The tank 12 communicates through an outlet 30 and line 32 with the heat exchange medium which can conveniently be formed from about 2,000 linear feet of ¾-inch iron pipe 34 mounted within the tank 14. The pipe 34 is bent in any convenient manner to form either a helical or zigzag structure within the tank 14. Mounted upon the pipe 32 is a temperature sensing means such as a thermocouple 33 which is operatively connected by means of conductors 35 to the electrically operated metering valve 22. Thus, during operation, if the temperature of the line 32 increases beyond a predetermined point, the valve 22 will be closed. When the temperature drops to a safe level, the valve 22 will be opened.

The end of the pipe 34 opposite the inlet pipe 32 is connected at 36 with an outlet line 38 which communicates at 40 with the interior of the storage tank 16. An outlet line 42 also communicates with the interior of storage tank 16 and includes an opening at the lower end thereof which is positioned in close proximity with the bottom of the tank. The upper end of line 42 is connected through a T coupling 44 with a line 46.

The line 46 is provided with a check valve 48 which allows flow in the direction of the T coupling 44. Also provided in line 46 is a manually operated shutoff valve 50 which communicates with a recording water meter 52 of a suitable known construction to indicate the number of gallons of water which have passed therethrough. The inlet side of the water meter 52 communicates through a pipe 54 with a line 56. The line 56 itself communicates with the heat exchange tank through a fill valve 58. Valve 58 is itself connected through line 60 with a line 62 positioned within an opening into the tank 14.

Also connected to the T coupling 44 is a line 70 which communicates through a circulating pump 72 with a line 74. The line 74 communicates through another T coupling 76 with a line 78 which leads to the interior of the reaction vessel through an inlet 80. During operation, the pump 72 is driven by a motor 75 (FIGURE 3) so as to transfer fluid from line 46 through the line 78 into the mixing tank 12.

Also communicating with the T coupling 76 is a line 90 which is connected to a manually operated loading valve 92 used for withdrawing and transferring aqueous ammonia through a dispensing hose 94 to a tank truck or the like (not shown). Communicating with the tank 14 is an outlet or overflow pipe 71. During operation, the water which passes into the tank 14 through the line 62 will be exhausted through the pipe 71 and can be disposed of in any convenient manner.

While various materials can be employed in the construction of the tanks, ducts and lines of the present invention, it is preferred that materials which are attacked by ammonium hydroxide such as copper and brass be avoided. It has been found convenient to construct most of the parts of the apparatus from iron.

Operation

The operation of the invention will now be described. To begin the process the meter 52 is set to zero, the tank car 26 is connected to line 25 and anhydrous ammonia is allowed to flow in to the tank 12 through the pipe 18. Simultaneously, water is allowed to flow from pipe 56 through pipe 54, meter 52, check valve 48 and pump 72 into tank 12. As the anhydrous ammonia passing through the perforated pipe 18 mixes with the water in tank 12 an exothermic reaction will take place within tank 12 during which ammonium hydroxide is formed. The ammonium hydroxide solution produced in the tank 12 will flow out through the line 32 into the transfer pipes 34. As the reaction products pass through line 34, they will be cooled and will emerge from line 38 at a substantially reduced temperature.

It should be noted that as the water passes through lines 56 and 54, the total quantity thereof will be recorded on the recording meter 52. After the transfer of a predetermined quantity of water through lines 56, 54, 46 and 78 and to the mixing tank 12, the operator should close the water valve 50 and energize the pump 72 which will serve to transport the relatively dilute solution of aqueous ammonia which is stored within the storage tank 16 through lines 42, 70, 74 and 78 and into the mixing tank 12 while anhydrous ammonia continues to flow through the lines 25 and 20 and into the tank 12.

Thus, as the operation proceeds, the concentration of the aqueous ammonia is continuously increased until a predetermined concentration has been reached.

If, for example, it is desired to produce a 20% solution of ammonium hydroxide by volume, it is only necessary to determine the volumetric capacity of the tank car and then add the appropriate amount of water to result in a 20% solution. Assuming the volume of anhydrous ammonia in the tank car is 20,000 gallons, the valve 50 should be turned off after 80,000 gallons of water is recorded at the meter 52 so as to form a 20% aqueous solution of ammonium hydroxide.

In summary, the process of converting the anhydrous ammonia in accordance with my invention comprises two stages. In the first stage, water is admixed continuously with the anhydrous ammonia while the resultant mixture is cooled until a predetermined volume of water has been mixed with the anhydrous ammonia to form a dilute solution of aqueous ammonia. Thereafter, the inflow of water is interrupted and the dilute solution of aqueous ammonia is continuously recirculated through the reaction vessel, cooling means and storage tank while additional anhydrous ammonia is added thereto until a predetermined volume of water and anhydrous ammonia have been mixed together.

The apparatus embodying the present invention was installed and tested under actual service conditions. It performed reliably and there was no tendency for excessive heat to be generated even though the aparatus was relatively small in size and inexpensive to construct and operate. Moreover, the operation could be carried out semiautomatically after the predetermined volume of water had been added to form the dilute solution. The apparatus and process of my invention is therefore more convenient to use than previous devices of the type described.

EXAMPLE

A railroad tank car filled with anhydrous ammonia and having a net weight of 52,000 pounds (10,400 gallons) under approximately 144 pounds pressure per square inch and at 82° F. was emptied into the mixing tank of an apparatus according to the invention as described hereinabove and having a storage tank 16 of 32,500 gallons capacity. In addition, 361.64 gallons of water were added with each 1,000 pounds of anhydrous ammonia fed to the mixing tank. Thus, a total of 18,805 gallons of water were mixed with the anhydrous ammonia to form a 25.8% solution of ammonium hydroxide.

The rate at which the water was added to the mixing tank varied from 100 to 150 gallons per minute. The flow rate of the ammonia into the mixing tank will depend upon the water temperature as well as the outside temperature. During the first five to six hours in which the anhydrous ammonia was unloaded from the tank car, it passed into the mixing tank at an average rate of about 1200 gallons per hour. The temperature of the mixing tank during the conversion operation varied from 150° to 170° F. The total unloading time of the tank car was from 10 to 12 hours and the total additional time required to complete the mixing operation was 15 minutes. The apparatus of the invention proved, during use, to be rugged in construction and reliable in operation. It was not subject to either excessive temperatures or other malfunction.

It is apparent that many modifications and variations of this invention as hereinbefore set forth may be made without departing from the spirit and scope thereof. The specific embodiments described are given by way of example only and the invention is limited only by the terms of the appended claims.

I claim:
1. An apparatus for converting anhydrous ammonia to an aqueous solution of ammonium hydroxide which comprises in combination:
   (A) a chamber for mixing anhydrous ammonia and water,
      (1) said chamber having an inlet and an outlet,
      (2) duct means connected to said inlet for connecting said chamber to a source of anhydrous ammonia under pressure,
      (3) distributor means within said chamber and connected to said inlet for distributing anhydrous ammonia within said chamber,

(4) further duct means connected to said chamber for connecting said chamber to a source of water, (5) valve means in said further duct means for interrupting the flow of water after a predetermined volume of water has been admixed with anhydrous ammonia in said mixing chamber, (B) a heat exchanger means for cooling newly formed ammonium hydroxide, (1) said heat exchanger including a first tank relatively larger in volume than said mixing chamber, (2) means for supplying a cooling medium to said first tank, (3) an elongated tortuous path duct within said first tank in indirect heat exchanging relationship with said cooling medium, (4) one end of said elongated duct being connected to the outlet of said mixing chamber, (C) an ammonium hydroxide storage tank relatively larger in volume than said heat exchanger tank, (1) the other end of said elongated duct of said heat exchanger means being connected to said storage tank, (2) duct means connecting said storage tank to the inlet of said mixing chamber, and (D) pump means in said duct between said storage tank and mixing chamber for circulating ammonium hydroxide between said storage tank and mixing chamber and from said mixing chamber through said heat exchanger means back to said storage tank.

2. The apparatus according to claim 1 further characterized in that said duct means connecting said storage tank to the inlet of said mixing chamber is connected to said further duct connecting said chamber to a source of water.

3. The apparatus according to claim 1 further characterized in that valve means are interposed in said duct means connecting said mixing chamber to a source of anhydrous ammonia and in said further duct means connecting said mixing chamber to a source of water for controlling the relative rates of flow such that the water is introduced to said mixing chamber at a materially greater rate than the ammonia.

4. The apparatus according to claim 1 wherein an electrically operated valve means is connected with the inlet of said mixing chamber and a temperature sensing means is connected to the outlet of the mixing chamber and operatively connected to the electrically controlled metering valve whereby the metering valve can be operated in response to the temperature of material flowing from the mixing chamber to the heat exchanger.

5. The apparatus according to claim 1 wherein a metering valve means is connected with the inlet of said mixing chamber and a temperature sensing means is connected to the outlet of the mixing chamber and operatively connected to the metering valve whereby said metering valve is operated in response to the temperature of material flowing from the mixing chamber to the heat exchanger, said mixing chamber comprising an elongated cylindrical horizontally disposed reaction chamber and an elongated distributing pipe having a plurality of openings therein, said pipe being mounted concentrically within said reaction chamber to distribute said anhydrous ammonia throughout a substantial length of said chamber.

References Cited

UNITED STATES PATENTS

| | | | |
|---|---|---|---|
| 2,701,182 | 2/1955 | Sellers et al. | 23—285 X |
| 2,890,937 | 6/1959 | Bresee | 23—193 |
| 3,073,678 | 1/1963 | Dugan | 23—285 X |

OTHER REFERENCES

Perry's Chem. Engineers' Handbook. Perry, Chilton, Kirkpatrick. 4th ed. McGraw-Hill Sec. 22–63 and 64.

JAMES H. TAYMAN, JR., *Primary Examiner.*

MORRIS O. WOLK, *Examiner.*